United States Patent

Mildner et al.

(10) Patent No.: US 9,156,499 B2
(45) Date of Patent: Oct. 13, 2015

(54) REAR SIDE PANEL ASSEMBLY OF A MOTOR VEHICLE BODY

(71) Applicant: GM GLOBAL TECHNOLOGY OPERATIONS LLC, Detroit, MI (US)

(72) Inventors: Udo Mildner, Limburg (DE); Lothar Teske, Aschaffenburg (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/522,414

(22) Filed: Oct. 23, 2014

(65) Prior Publication Data

US 2015/0108790 A1 Apr. 23, 2015

(30) Foreign Application Priority Data

Oct. 23, 2013 (DE) .......................... 10 2013 017 732

(51) Int. Cl.
*B62D 29/00* (2006.01)
*B62D 25/02* (2006.01)
*B62D 25/16* (2006.01)

(52) U.S. Cl.
CPC .............. *B62D 25/02* (2013.01); *B62D 25/16* (2013.01); *B62D 25/163* (2013.01)

(58) Field of Classification Search
CPC ....... B62D 25/02; B62D 25/16; B62D 25/163
See application file for complete search history.

(56) References Cited

U.S. PATENT DOCUMENTS

| 2,474,992 A | 7/1949 | Stephenson et al. |
| 4,717,197 A | 1/1988 | Harasaki |
| 4,973,103 A * | 11/1990 | Imajyo et al. ............ 296/203.04 |
| 2011/0233970 A1 * | 9/2011 | Nagai et al. .............. 296/203.03 |
| 2012/0200119 A1 * | 8/2012 | Juettner et al. ........... 296/193.05 |

FOREIGN PATENT DOCUMENTS

| DE | 1480434 A1 | 7/1969 |
| DE | 19724427 A1 | 12/1998 |
| DE | 19946013 A1 | 3/2001 |

OTHER PUBLICATIONS

Great Britain Patent Office, Great Britain Search Report for Great Britain Application No. 1418148.1, dated May 22, 2015.

* cited by examiner

*Primary Examiner* — Lori L Lyjak
(74) *Attorney, Agent, or Firm* — Ingrassia Fisher & Lorenz PC (57) ABSTRACT

A rear side panel assembly of a motor vehicle body includes an inner side panel element and an outer side panel element. The inner and outer side panel elements are joined to one another in the transverse direction (y) of the vehicle. The inner side panel element has, in relation to the vertical direction (z) of the vehicle, a wheel arch adjoining downwards onto a longitudinal beam and an inner roof frame profile adjoining upwards onto a vehicle roof. The outer side panel element has on its outer side, facing away from the inner side panel element, a connection region for the detachable arrangement of a rear fender.

15 Claims, 7 Drawing Sheets

REAR SIDE PANEL ASSEMBLY OF A MOTOR VEHICLE BODY

CROSS REFERENCE TO RELATED APPLICATION

This application claims priority to German Patent Application No. 102013017732.4 filed Oct. 23, 2013, which is incorporated herein by reference in its entirety.

TECHNICAL FIELD

The technical field relates to a rear side panel assembly of a motor vehicle body with an inner and an outer side panel element, which are joined to one another in transverse direction (y) of the vehicle

BACKGROUND

Self-supporting motor vehicle bodies typically have a multiple-shell structure in the side panel region. The rear region of motor vehicles, in particular of passenger vehicles, generally has an outer sheet metal shell having a large area and being in a single piece, which in the case of damage is only able to be repaired at great expense. In the case of damage to a fender, at least partially surrounding a rear wheel arch, in some instances the entire outer sheet metal shell extending from the side skirt or longitudinal frame up to a roof railing is to be replaced or dismantled for repair purposes.

For example, DE 199 46 013 A1 discloses a side framework for a self-supporting body, which has an inner side frame and an outer side frame. The two side frames are joined together here in the transverse direction of the vehicle, and the outer side frame is constructed in one piece.

Current rear fender arrangements in the region of the wheel arch are in addition connected with an opening boundary of an inner side panel element delimiting the wheel arch. The outer shell of the side panel or respectively the rear fender can be connected here to the inner side panel for example by means of an inwardly directed flanging. Such a fastening can, however, be liable to corrosion in the long-term operation of the motor vehicle.

SUMMARY

An embodiment of the present disclosure provides a rear side panel assembly of a motor vehicle body which enables a favorably priced and simple repair in the case of damage and which can ultimately lead to a more favorable insurance classification of the motor vehicle. In addition, the side panel assembly is to be distinguished by a simple and efficient mounting and by improved mechanical characteristics. The rear side panel assembly results in a motor vehicle body having an improved stability, torsional rigidity, preferably with a saving on weight and material.

The rear side panel assembly of a self-supporting motor vehicle body provided in this respect has an inner side panel element and an outer side panel element. The inner and outer side panel element are joined to one another here in the transverse direction (y) of the vehicle. Both side panel elements typically have sheet metal shells corresponding to, or complementary to one another, which are able to be or respectively are joined to one another largely in an overlapping manner in the transverse direction of the vehicle, to form the side panel assembly.

At least the inner side panel element has, in relation to the vertical direction (z) of the vehicle, a wheel arch downwardly adjoining a longitudinal beam of the motor vehicle body, and an inner roof frame profile upwardly adjoining vehicle roof The inner side panel element therefore extends from the vehicle floor up to the vehicle roof. The outer side panel element can have a planar structure and contour comparable herewith, which likewise extends for instance from a side skirt up to the roof frame. Independently of the specific geometric configuration, however, the outer side panel element has on its outer side, facing away from the inner side panel element, a connection region for the detachable arrangement of a rear fender.

In particular, the configuration of the outer side panel element enables a separate and discrete arrangement of a rear fender of a motor vehicle body. This can be detached from the connection region of the outer side panel element without difficulty in the case of damage, and can be replaced by a corresponding replacement part. The detachable arrangement of the rear fender or respectively of the outer contour of the side panel provided in the fender region makes a fastening of the fender to the inner or outer side panel element by means of flanging superfluous, so that the fender is able to be fastened to the assembly without flanging and therefore free of deformation.

Connection and fastening concepts provided for this are much less liable to corrosion, so that by means of the detachable arrangement of the separate rear fender on the rear side panel assembly, the liability to corrosion of the fender or respectively of the inner and outer side panel element, therefore of the entire motor vehicle body, can be reduced in long-term operation. Furthermore repair and maintenance costs can be reduced through the separate and discrete arrangement of the rear fender on the outer side panel element of the motor vehicle body. This arrangement has, in addition, the potential for a more favorable insurance classification of the motor vehicle.

According to an embodiment, the rear fender is able to be integrated in a surface-flush manner into the outer contour of the outer side panel element. The rear side panel assembly has on its outer side in particular an inwardly recessed region in transverse direction (y) of the vehicle, for receiving the rear fender in a surface-flush manner. The impression depth corresponds here at least to the sheet metal thickness of the fender, so that the latter is able to be arranged in a surface-flush manner onto adjoining outer contour regions of the outer side panel element.

Corresponding fastening means for the rear fender and also connection points for this on the side panel element side are configured such that a component tolerance compensating mounting can take place for minimizing or respectively maintaining predetermined maximum clearances.

According to a further embodiment, the outer side panel element has, above a wheel arch recess, a support for the rear fender. This support is set back with respect to an outer contour, adjoining upwardly hereto, of the outer side panel element in the transverse direction (y) of the vehicle. The support can extend here continuously, for instance from a front outer column profile to an outer rear reinforcement profile of the outer side panel element. In particular, the support for the rear fender can extend continuously from the front end, lying at the front in the direction of travel, to the rear end, lying at the rear in the direction of travel, of the outer side panel element.

By means of a support configured in such a manner, an arrangement and support of the rear fender on the outer side panel element can take place over a comparatively large area, even largely over the entire area. A support and bearing of the fender on the outer side panel element over as large an area as possible contributes to a secure, durable and inherently stable fastening of the fender on the rear side panel assembly.

According to a further development, the rear fender is able to be fastened to the outer side panel element beneath and adjacent to a belt line running in the longitudinal direction of the vehicle. In particular, the outer side panel element together with the inner side panel element can have a window cut-out for a rear side window, which extends for example between a C column and a D column of the side panel assembly.

The belt line runs here typically along the lower side edge of the window cut-out. The support, recessed back or respectively graduated inwardly in the transverse direction of the vehicle, for the rear fender can in this respect adjoin from below onto the belt line or respectively onto the lower edge of a window cut-out of the outer side panel element.

The separate and modular arrangement of the rear fender beneath a window cut-out of the outer side panel element is particularly advantageous especially for the concealing of an assembly gap. As the lower edge of a for instance fixed rear side window is in any case to be provided with a cover or trim, an upper edge section of the fender can likewise be concealed by such a cover.

According to a further embodiment, the outer side panel element has, in the region of the belt line, an outwardly projecting mount for screwing with an inwardly projecting fastening angle of the fender, configured in a corresponding manner hereto. By means of an outwardly projecting mount, extending for instance a right-angles from the shell of the outer side panel element, the fender can undergo a support in vertical direction (z) of the vehicle by means of a fastening angle constructed hereon, and in this respect can be aligned and mounted on the side panel assembly via the mount also in the vertical direction of the vehicle.

The mount on the side panel side and also the fastening angle of the fender can have here a predetermined extent in the longitudinal direction of the vehicle, so that the fender, in addition to a longitudinally extended support, is also able to be fastened several times and along the mount on the outer side panel element. The inwardly projecting fastening angle of the fender typically has slots, aligned in the transverse direction (y) of the vehicle, to receive fastening threaded fasteners. The slot configuration on the part of the fastening angle enables a fastening of the fender in the transverse direction (y) of the vehicle which compensates component and mounting tolerances.

According to a further development, the inner side panel element has, in addition, an inner rear reinforcement profile extending in the vertical direction of the vehicle. The inner side panel element is reinforced structurally via the inner rear reinforcement profile. The inner rear reinforcement profile is constructed, in particular, in one part or respectively in one piece with the side panel element. In this respect, it is integrated into the side panel element. A profiled configuration, for instance L-shaped in cross-section, of the rear end section of the inner side panel element gives the inner side panel element per se an increased structural and torsional rigidity.

Furthermore, the inner rear reinforcement profile is able to be connected by a lower end directly with the longitudinal beam, by an upper end directly with a roof transverse beam. The inner rear reinforcement profile therefore extends in particular in one part from the vehicle floor up to the vehicle roof Hereby, the structural rigidity and torsional rigidity of the side panel assembly can be improved. Also, the acoustic characteristics, in particular the natural vibration- or respectively resonance behavior of the motor vehicle body can be improved by resonance conditions which are changed in this respect, and ultimately the driving comfort can be increased.

In a further embodiment, the inner side panel element has, in addition, a lower outer rear reinforcement profile extending in the vertical direction (z) of the vehicle, which terminates upwards in the vertical direction of the vehicle and toward the rear in the longitudinal direction (x) of the vehicle respectively with the wheel arch. The lower outer rear reinforcement profile is therefore provided only locally in a region extending from the longitudinal beam up to the upper end of the wheel arch on the inner side panel element. The inner rear reinforcement profile and the lower outer rear reinforcement profile of the inner side panel element are typically arranged here spaced apart from one another in the longitudinal direction (x) of the vehicle, with the formation of an intermediate space.

In this way, the inner rear reinforcement profile and the lower outer rear reinforcement profile in the further assembling of the rear side panel assembly can form, in particular with the outer side panel element, a rear reinforcement profile, if applicable in the manner of a hollow profile, and closed. The rear reinforcement profile can be configured here in particular as a circumferential profile ring surrounding a rear opening, which profile ring can structurally reinforce and stiffen the entire rear part of the motor vehicle body.

In further development, the outer side panel element has an upper outer rear reinforcement profile which, with the formation of a rear reinforcement profile, is arranged at least partially overlapping with the lower outer rear reinforcement profile. The upper outer rear reinforcement profile of the outer side panel element extends, as it were, the lower outer rear reinforcement profile of the inner side panel element. The upper and lower outer rear reinforcement profile therefore form, in the assembling of the inner and outer side panel element, an outer rear reinforcement profile extending in the vertical direction (z) of the vehicle from the longitudinal beam up to a vehicle roof.

The inner and the outer rear reinforcement profile have here profile cross-sections complementary to one another or respectively corresponding to one another, which can form, for example, a rear reinforcement profile in the manner of a hollow profile. The rear reinforcement profile can provide here the function of a D column of the self-supporting motor vehicle body.

The division of the outer rear reinforcement profile into upper and lower outer rear reinforcement profile can prove to be advantageous in particular for the purposes of mounting technique. This is the case in particular when according to a further embodiment at least one of the inner and outer rear reinforcement profiles of the inner side panel element has at least one through-opening for a fastening tool. Advantageously, both, namely the inner and the outer lower rear reinforcement profile of the inner side panel element each have a through-opening, which is constructed for example for guiding a cable set through for a rear light and is provided accordingly.

Via these through-openings, particularly the regions, lying in the interior of the inner and outer rear reinforcement profile, of the reinforcement profile on the rear side formed herefrom are accessible for a fastening tool, thus for example for a welding gun. The individual components of the rear side panel assembly can be joined together and connected with one another in various ways.

Spot welding and laser welding and also riveting, clinching or reciprocal bonding of the components come into consideration, for instance, as joining- and connecting methods. By at least one through-opening, which is provided in any case for guiding cables through, providing a possibility for access for fastening tools, from the inner and/or lower outer rear reinforcement profile of the inner side panel element, other through-openings, which would be provided solely for tool access, can be dispensed with. As through-openings in the side panel elements always mean a structural weakening, by elimination of separate through-openings which are to be provided for fastening tools, the stability and structural rigidity of the rear side panel assembly can be further improved.

According to a further embodiment, the upper outer rear reinforcement profile of the outer side panel element has at least one fastening site for a rear fastening angle of the fender, projecting radially inwards in the transverse direction (y) of the vehicle. In this respect, the fender, which is to be fastened separately on the side panel assembly, can be fastened with its inwardly projecting fastening angle on the upper outer rear reinforcement profile, which likewise projects inwards in the transverse direction of the vehicle, in the longitudinal direction (x) of the vehicle. In this way, the position of the fender can be fixed or respectively also adjusted with respect to the longitudinal direction of the vehicle.

Through the direct connection with the outer rear reinforcement profile, the fender can be fastened directly on bearing or respectively structure-reinforcing components of the rear side panel assembly. Hereby, a particularly stable and durable rear fastening of the fender is made possible.

According to a further embodiment, the rear side panel assembly has a fender fastened detachably on the outer side panel element. In particular, the fender is screwed to the outer side panel element, so that in the case of damage, the fender can be dismantled and replaced merely by the loosening of fastening threaded fasteners. Provision is made here in particular that the fender is fastened several times, i.e. via several fastening points arranged spaced apart from one another on the outer side panel element. All of these fastening points or fastening sites can be provided with fastening threaded fasteners. However, it is also conceivable to embody individual fastening sites differently, for instance as clips or detent connections, which enable a reduction in the effort for mounting and repair.

According to a further embodiment, the rear side panel assembly has, in addition, a reinforcement profile which extends on an outer side of the wheel arch of the inner side panel element with a front profile section from a spring plate connection piece, coming to lie at the height of the longitudinal beam, to a central profile section arranged at the height of an upper boundary of the wheel arch. At the central profile section, the reinforcement profile has, in addition, a shock absorber connection for the fastening of an end of a shock absorber, facing away from a rear wheel.

The spring plate connection piece constructed at the lower front end of the front profile section is constructed for direct connection and fastening to and with a spring plate for the chassis connection of the motor vehicle. In this respect, the suspension and also the damping of the rear wheel can be supported on the one hand via the spring plate and the spring plate connection piece adjoining hereto and on the other hand via the shock absorber connection, constructed on the central profile section of the reinforcement profile, on one and the same reinforcement profile.

Hereby, an improved and structurally reinforced chassis connection to the motor vehicle body can be achieved. Finally, the forces introduced via the chassis into the motor vehicle body can be diverted and transferred into the vehicle body in a uniformly distributed manner via the reinforcement profile. By means of the reinforcement profile, in addition, both regions of the vehicle body, namely the regions provided for the bumper connection and for the spring connection and coming to lie spaced apart from one another, can be reinforced structurally for the rear wheel- or respectively rear axle connection with one and the same reinforcement profile.

Through this integration of the chassis connection points on the body side into the reinforcement profile, the number of body components can be reduced. In the end effect, this can lead to a reduction of the effort of manufacture and also of the manufacturing and production costs. By the reinforcement profile extending from a spring plate to a shock absorber connection, for instance in the upper apex section of the wheel arch, the body can also receive in that region an additional structural reinforcement and strengthening. In this respect, the reinforcement profile can also contribute to an increase of the torsional rigidity of the body as a whole.

The reinforcement profile can have here at least partially a cross-section of C- or U-profile shape. For this, it can have outwardly projecting flanges, which are respectively able to be structurally connected with the envelope curve, in particular with the outer side of the wheel arch. Outwardly projecting flanges or flange sections of the C- or U-shaped reinforcement profile can also be constructed in one piece or respectively as sections of a circumferential flange, which is securely connected either over the entire surface or at selected points with the wheel arch.

According to a further embodiment, the reinforcement profile has a rear profile section projecting inwards in the transverse direction (y) of the vehicle, at an end facing away from the spring plate connection piece. The rear profile section of the reinforcement profile is structurally connected in addition here with at least one outer rear reinforcement profile of the inner or of the outer side panel element. In particular, the rear profile section of the reinforcement profile can be connected with the lower outer rear reinforcement profile of the side panel element, whereby the inner side panel element surrounding the wheel arch receives a further structural reinforcement or respectively stiffening.

It is, however, also conceivable that the rear profile section of the reinforcement profile is structurally connected with the upper outer rear reinforcement profile of the outer side panel element. Through the structural connection, of whatever kind, of the rear profile section of the reinforcement profile with at least one rear reinforcement profile of the inner or outer side panel element, in any case a structural connection of the reinforcement profile to the rear reinforcement profile can be achieved. Hereby, the forces introduced via the suspension and via the shock absorber into the body can be diverted particularly well into adjoining bearing structural components, namely into the rear, preferably circumferential and closed, reinforcement profile. The stability and also the inherent rigidity of the entire motor vehicle body and its acoustic resonance behavior can be improved hereby in a targeted manner.

According to a further aspect, finally, a motor vehicle body is provided, which has a previously described rear side panel assembly. A further independent aspect relates in addition to a motor vehicle which has a previously described rear side panel assembly.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
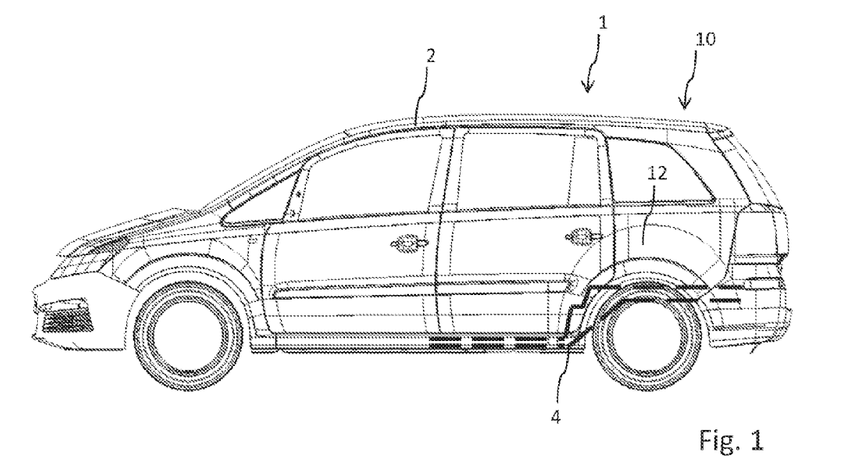
FIG. 1 is a diagrammatic side view of a motor vehicle.

The motor vehicle 1 shown in side view in FIG. 1 has a self-supporting motor vehicle body 2 with an inner side panel element 20. The motor vehicle body 2 is additionally equipped with a rear side panel assembly 10, shown in full in FIG. 9, which has a rear fender 12 detachably arranged hereon. The rear side panel assembly 10 extends from a longitudinal beam 4, running in the longitudinal direction (x) of the vehicle upwards to a vehicle roof 7.

Figure 3:
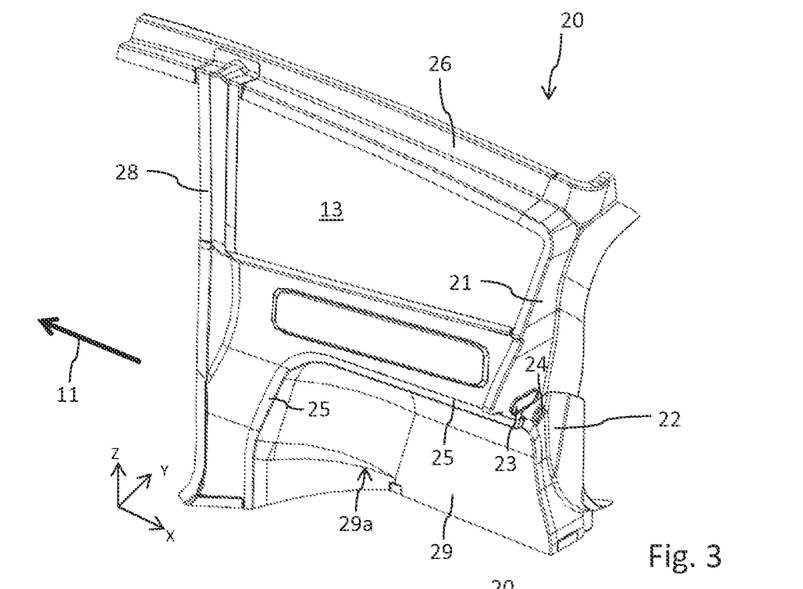
FIG. 3 is a perspective side view of an inner side panel element.
Figure 4:
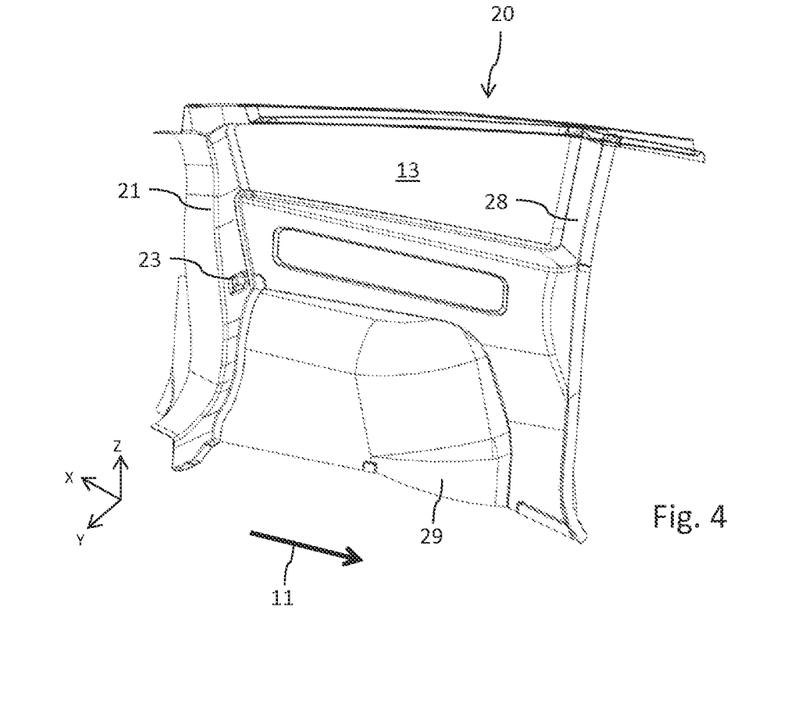
FIG. 4 is a perspective side view of the side panel element according to FIG. 3 viewed from the interior.
Figure 5:
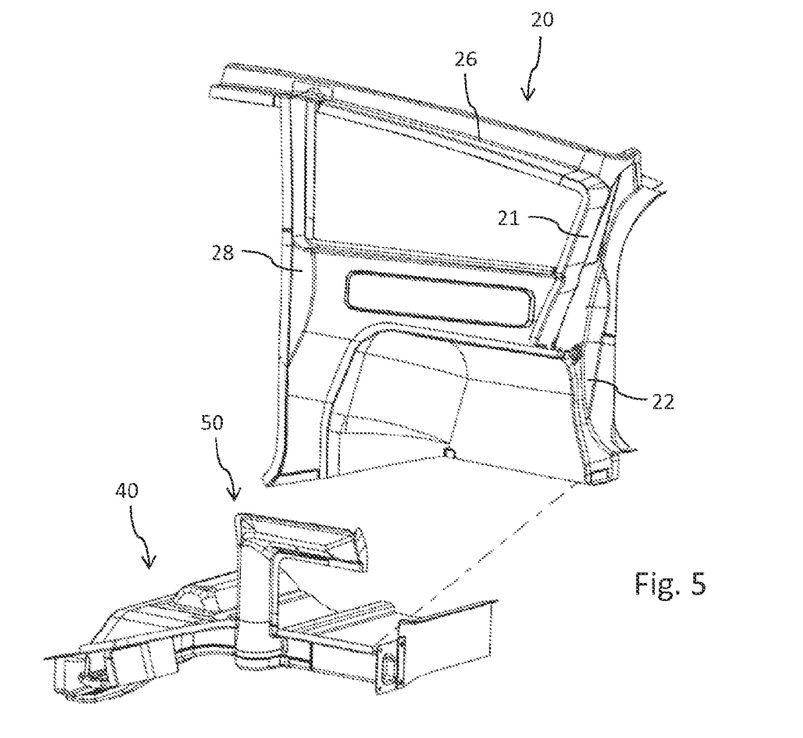
FIG. 5 is the perspective illustration of a joining process of floor assembly and inner side panel element.
Figure 7:
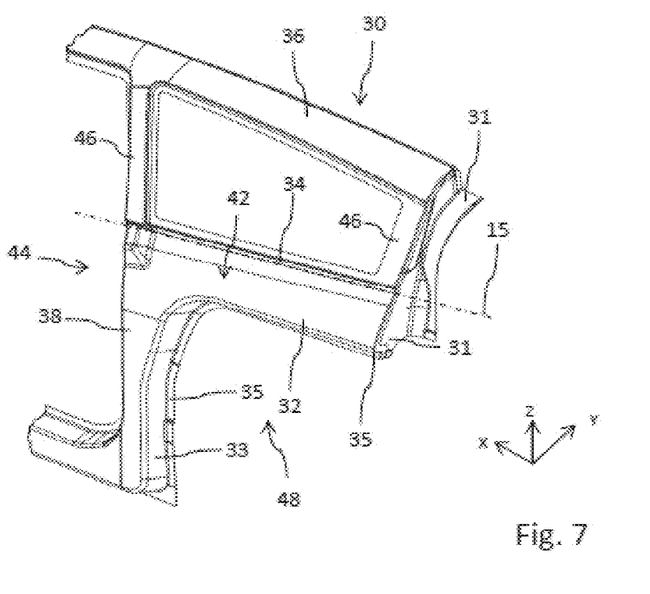
FIG. 7 is a perspective illustration of an outer side panel element, viewed from the exterior.
Figure 8:
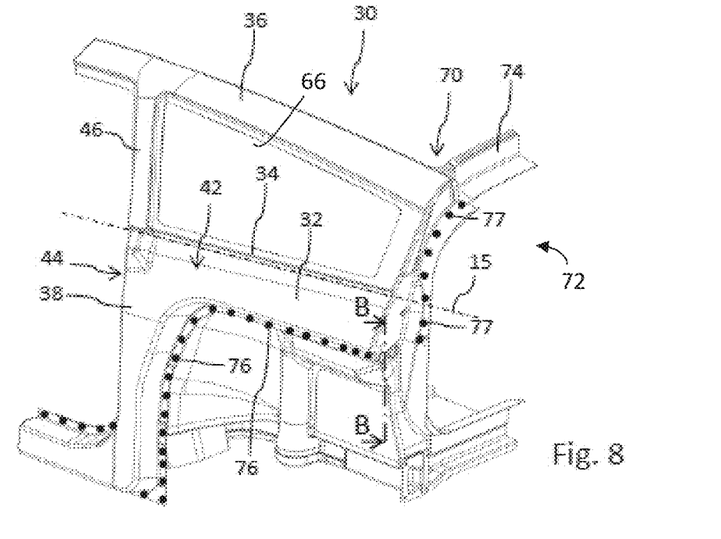
FIG. 8 is the lower assembly shown in FIG. 6 with the outer side panel element according to FIG. 7 arranged thereon.

The rear side panel assembly 10 has, in addition, an inner side panel element 20, illustrated in isolation in FIG. 3, and an outer side panel element 30, illustrated separately in FIG. 7. The inner and the outer side panel element 20, 30, as can be seen from the illustration according to FIG. 8, are to be arranged substantially overlapping with respect to one another for the formation of the rear side panel assembly 10 and are to be connected with one another in the transverse direction (y) of the vehicle. In the present example embodiment, the inner side panel element 20 and the outer side panel element 30 have respectively a window cut-out 13 for the arrangement of a fixed rear side window 66.

As can be seen from the illustration according to FIG. 3, the inner side panel element 20 has a wheel arch 29, curved inwardly in the transverse direction (y) of the vehicle, which is configured following a wheel envelope curve. Toward the front, in the direction of travel 11, the inner side panel element 20 is delimited by an inner column profile 28 extending substantially in the vertical direction (z) of the vehicle, the upper end of which continues into an inner roof frame profile 26 running substantially in the longitudinal direction of the vehicle. A rear end of the inner roof frame profile 26 continues further into an inner rear reinforcement profile 21, which extends from a lower end section of the wheel arch 29 continuously up to the inner roof frame profile 26.

The inner roof frame profile 26 and also the inner rear reinforcement profile 21 are configured to be substantially L-shaped in cross-section, in order in particular to form a closed hollow profile structure with L-shaped profile sections of the outer side panel element 30 which are configured in a complementary manner hereto. The wheel arch 29 is delimited toward the front, in travel direction 11, and also upwards, by a fastening edge 25 which is integrated into the surface of the inner side panel element 20. Along this fastening edge 25, the outer side panel element 30, shown in isolation in FIG. 7, is able to be connected or respectively fastened to the inner side panel element 20 in the region of the wheel arch 29.

As can be seen from the illustration according to FIG. 7, the outer side panel element 30 has an outer roof frame profile 36, running substantially in the longitudinal direction (x) of the vehicle, and an outer upper rear reinforcement profile 31 at its end section facing away from the direction of travel. An imaginary belt line 15 runs beneath a window cut-out 13 of the outer side panel element 30. Beneath this belt line 15, the outer side panel element 30 is provided with a support 32, which is configured set back inwards, in the transverse direction (y) of the vehicle, with respect to an outer contour 46 of the outer side panel element 30 adjoining the belt line 15 from above.

The support 32 can be in particular recessed inwards and can have an inwardly projecting return or shoulder 34 along the belt line 15. The support 32 serves in particular for the planar bearing, connection and support of a fender 12, shown in the final mounting position, on the outer side panel element 30. The outer side panel element 30 also has an outer column profile 38, lying at the front in relation the direction of travel 11, extending substantially in the vertical direction (z) of the vehicle, which column profile forms a C column structure of the motor vehicle body 2 together with the inner column profile 28 of the inner side panel element 20.

In a similar manner, the upper outer rear reinforcement profile 31 of the outer side panel element 30 also forms a rear reinforcement profile 70 with the inner rear reinforcement profile 21 of the inner side wall element 20 lying therebeneath.

The outer side panel element 30 has, in addition, a Z- or L-shaped contour in the region beneath the belt line 15. In this respect, a wheel arch cut-out 48 is provided beneath the support 32, which wheel arch cut-out is provided circumferentially, i.e. upwards and towards the front with an inwardly projecting flange 35, i.e. facing the wheel housing. The flange 35, which projects radially inwards via a side wall 33, inwardly aligned in the transverse direction of the vehicle, from the outer column profile 38 and from the support 22 in relation to a wheel axis which is not shown, is structurally connected, as indicated in FIG. 8 via various joining sites 76, with the fastening edge 25 of the inner side panel element 20. The joining sites 76 can represent individual weld spots. However, they can also denote rivet connections or connection sites created by means of clinching or by bonding.

Figure 9:
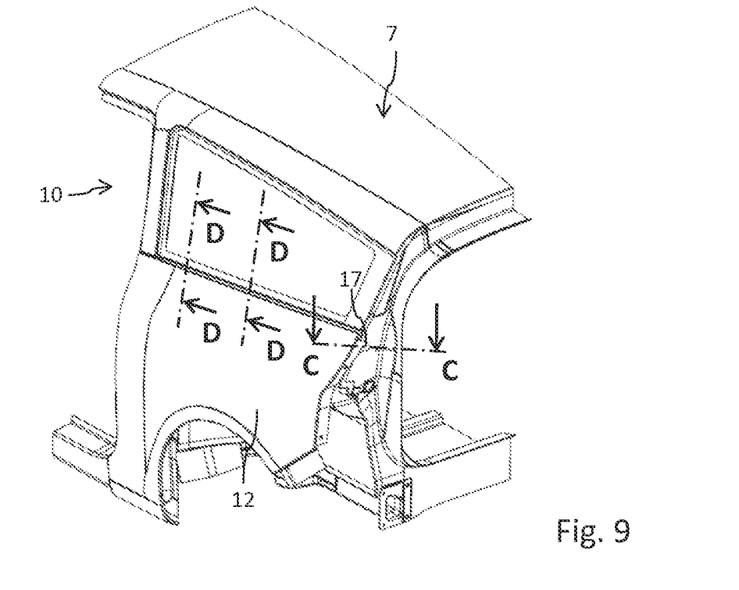
FIG. 9 is a further illustration of the assembly shown in FIG. 8 with a fender arranged thereon.

By the outer side 44 of the outer side panel element 30 being recessed inwards at least in the region beneath the belt line 15, the fender 12 shown in FIG. 9 can be fastened detachably and in a surface-flush manner on the rear side panel assembly 10, in particular on the outer side panel element 30, in the connection region 42 extending from the support 32 to over the outer column profile 38. For the fastening or respectively mounting of the fender 12 on the outer side panel element 30, as illustrated in cross-section according to FIG. 13, an outwardly projecting mount 37 is constructed in the region of the belt line 15 on the outer side panel element 30. Correspondingly hereto, the fender 12 has a fastening angle 18 projecting inwardly in the transverse direction (y) of the vehicle, which can rest in an overlapping manner in the vertical direction (z) of the vehicle on the mount 37. The fender 12 can be screwed to the outer side panel element 30 by means of a threaded fastener 64, which penetrates both the fastening angle 18 and also the mount 37.

Figure 13:
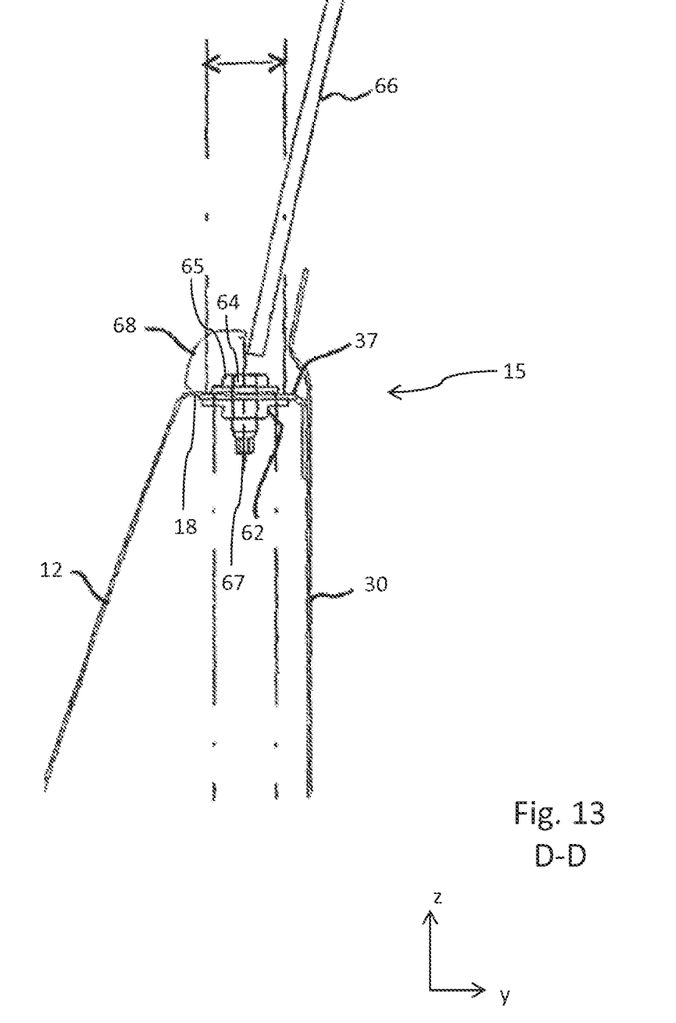
FIG. 13 is a cross-section D-D according to FIG. 9.

As can be seen in addition from the illustration according to FIG. 13, the upper connection region of the fender 12 is provided with a cover 68, which functions at the same time as a cover or trim of a lower edge of a pane arranged in the window cut-out 13. The cover 68 is able to be mounted after the mounting of the pane 66 and of the fender 12. On the underside of the mount 37 typically a weld nut 62 is arranged, which cooperates with a thread of the threaded fastener 64 for the formation of a screwed connection. The head 65 of the threaded fastener 64, coming to lie above the fastening angle 18, can be used during the first mounting of the fender 12 for the screwing in of the threaded fastener 64 into the weld nut 62.

For a subsequent dismantling of the fender 12, for instance for repair or maintenance purposes, the lower threaded fastener end 67 is also provided with an internal or outer spanner flat, for instance of hexagonal or torx construction. When the wheel is dismantled, the underside of the mount 37 is also accessible from the exterior, so that the screwed connection of the fender 12 can be loosened, if necessary, without dismantling the cover 68. The upper fastening angle 18 of the fender 12 is typically provided with longitudinal slots running in the transverse direction (y) of the vehicle, so that the fender 12 can only be removed towards the exterior by loosening the screwed connection.

Figure 10:
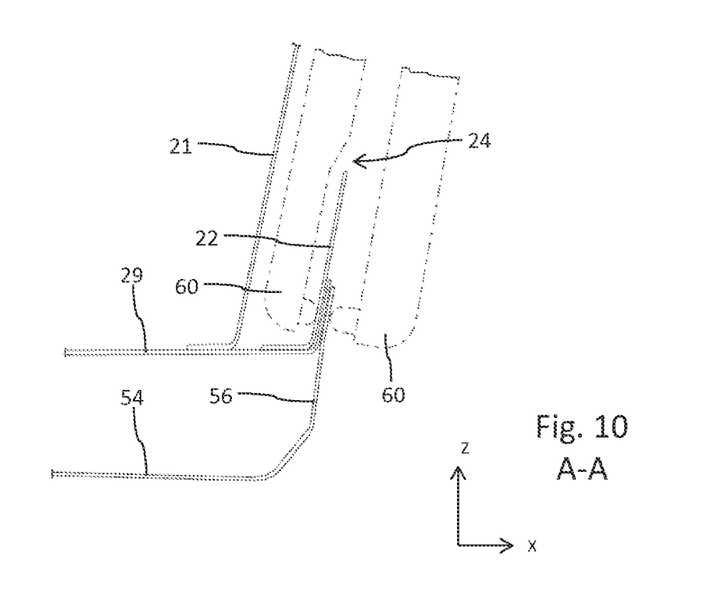
FIG. 10 is a cross-section A-A according to FIG. 6.
Figure 11:
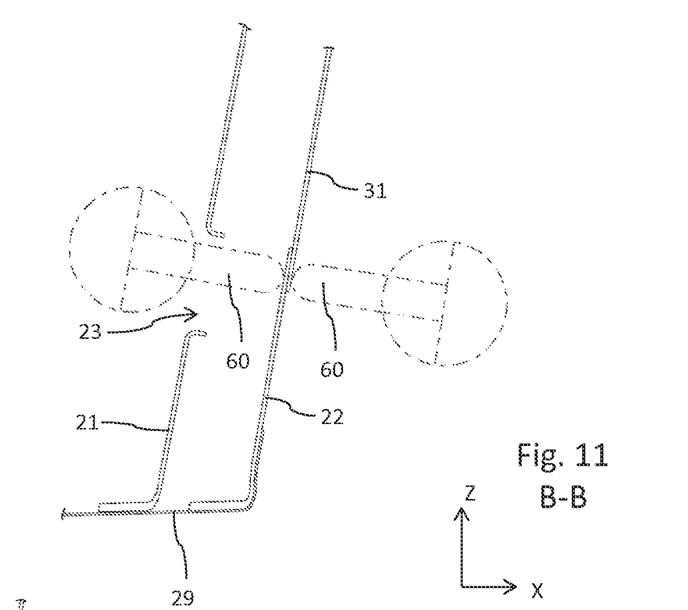
FIG. 11 is a cross-section B-B according to FIG. 8.

The inner side panel element 20 also has, in addition to the inner rear reinforcement profile 21 running from the floor to the roof 7, a lower outer rear reinforcement profile 22 which, viewed in the longitudinal direction (x) of the vehicle, is arranged spaced apart from the inner rear reinforcement profile 21, as can be seen for example from the cross-section according to FIG. 10 and FIG. 11. The lower outer rear reinforcement profile 22 of the inner side panel element 20 is continued upwards from the upper outer rear reinforcement profile 31 of the outer side panel element 30.

The rear reinforcement profiles 21, 22, 31 form in this manner a closed, reinforcement profile 70 on the rear side, which adjoins downward onto a rear section of the longitudinal beam 4 and upward onto a roof transverse beam 74 extending in the transverse direction (y) of the vehicle. The reinforcement profile 70 on the rear side is shown in FIG. 8 only in the region of the left side panel. The reinforcement profile 70 on the rear side can be constructed in particular as a profile ring surrounding a rear opening 72 of the motor vehicle body 2. As illustrated further in FIG. 8, the upper outer rear reinforcement profile 31 is structurally connected via several joining sites 77 with the upper section of the inner rear reinforcement profile 21.

Figure 2:
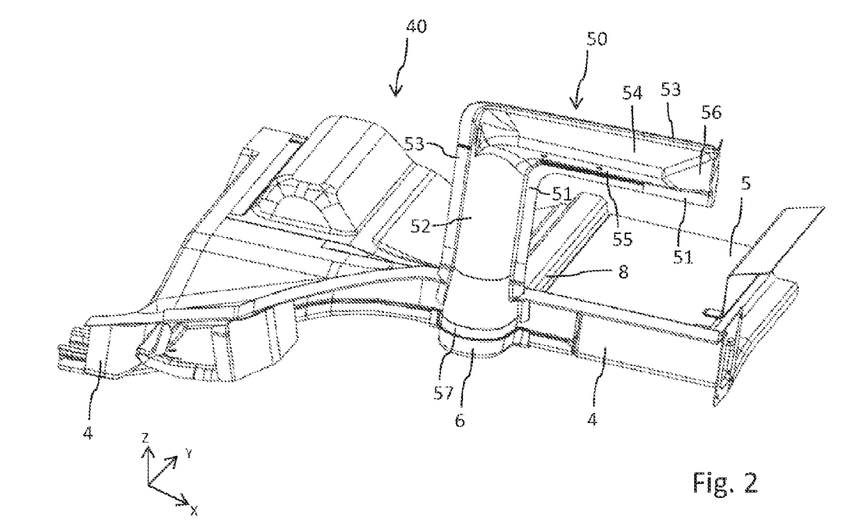
FIG. 2 is a perspective illustration of a floor assembly of a motor vehicle body.

The rear side panel assembly 10 is additionally provided with a reinforcement profile 50, C- or U-shaped in cross-section, which in a pre-mounting configuration can be connected with the floor assembly 40 shown separately in FIG. 2. As illustrated in FIG. 2, the floor assembly 40 has a lateral longitudinal beam 4 extending substantially in the longitudinal direction (x) of the vehicle, which is connected for example via a transverse beam 8, running substantially in the transverse direction (y) of the vehicle, with a right longitudinal beam running parallel hereto, but not shown here.

In addition, a floor pan 5 extends between the longitudinal beam 4 and the transverse beam 8. In the region of the structural node formed by the longitudinal beam 4 and the transverse beam 8, in addition a spring plate 6 is provided to receive a suspension of a vehicle axle or respectively an axle suspension Immediately adjoining hereto, the reinforcement profile 50, constructed in an L-shape, extends upwards, which reinforcement profile is connected structurally, i.e. in a load-transferring manner, with the spring plate 6 via a spring plate connection piece 57. The reinforcement profile 50 has a front profile section 52 extending substantially in the vertical direction of the vehicle, which approximately on reaching an upper end section of the wheel arch 29 continues toward the rear, angled in the longitudinal direction (x) of the vehicle, into a central profile section 54.

Figure 6:
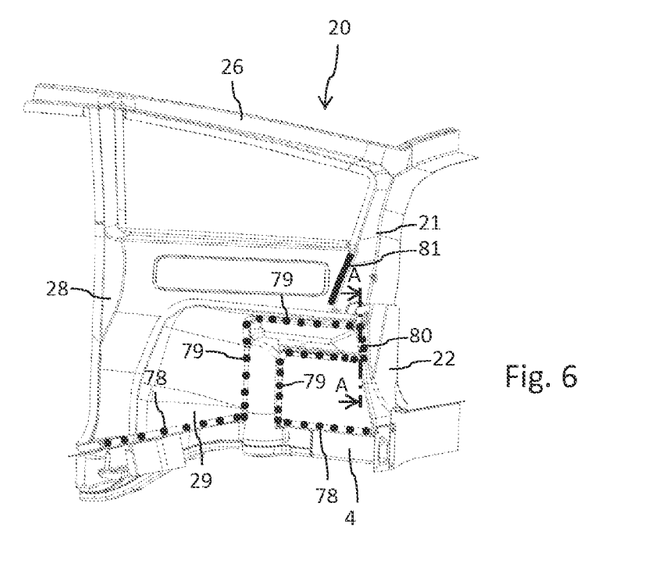
FIG. 6 is a corresponding perspective illustration of the inner side panel element fastened to the floor assembly.

The central profile section 54 opens at the rear side into a rear profile section 56, as illustrated in FIGS. 6 and 10, coming to rest directly against the lower outer rear reinforcement profile 22. The central profile section 54, extending substantially in the longitudinal direction of the vehicle, also has, in a downward direction, facing a rear wheel, a shock absorber connection 55 for fastening a free end, facing away from a rear wheel, of a shock absorber which is not shown here.

The wheel or respectively axle connection onto the motor vehicle body 1 can be reinforced and improved by means of the reinforcement profile 50. The reinforcement profile 50 has here in addition an outer flange section 53 and an inner flange section 51, which come to lie respectively almost over the entire area against the outer side 29a of the wheel arch 29 of the inner side panel element 20 and are able to be connected directly with the wheel arch 29 along there in accordance with the joining sites 79. The rear profile section 56 of the reinforcement profile 50 is connected directly with the lower outer rear reinforcement profile 22 via further joining sites 80, as indicated in FIG. 6 and FIG. 10.

In the present example embodiment, an assembly sequence is provided in accordance with the sequence of FIGS. 2 to 9. Starting from an already preconfigured floor assembly 40 with the reinforcement profile 50, in a first mounting step, indicated in FIG. 5, firstly the inner side panel element 20 is connected with the floor assembly 40. A lower edge section of the wheel arch 29 is structurally connected here by means of several joining sites 78 directly with the longitudinal beam 4. Also, the reinforcement profile 50 is connected along its flanges 51, 53 and along its rear profile section 56 with the outer side 29a of the wheel arch 29 and with an outer corner of the lower outer rear reinforcement profile 22 via joining sites 80.

In addition, an outwardly projecting section of the inner rear reinforcement profile 21 can be provided with an adhesive layer 81, in particular with a structural adhesive, for instance at the height of the support 32 of the outer side panel element 30, as shown in FIG. 6, in order to form an adhesive connection on joining together with the outer side panel element 30 in this region.

In FIG. 10 in a cross-section running along the vertical axis (z) of the vehicle and the longitudinal axis, the connection is illustrated of the rear profile section 56 with the wheel arch 29 and overlapping hereto with the lower outer rear reinforcement profile 22. The lower outer rear reinforcement profile 22 has a through-opening 24, which enables the introduction of a fastening tool 60, here in the form of a welding gun, into the region formed between the inner rear reinforcement profile 21 and the lower outer rear reinforcement profile 22.

The inner rear reinforcement profile 21 is also provided with a through-opening 23, as can be seen from the cross-section of FIG. 11. Both through-openings 23, 24 are arranged approximately in alignment to one another, in order for example to lay a cable set to a rear light module. Therefore, after mounting of the outer side panel element 30, a fastening tool 60 can also be guided through the through-opening 23 of the inner rear reinforcement profile 21, in order to structurally connect the upper outer rear reinforcement profile 31 in overlap with the lower outer rear reinforcement profile 22.

Figure 12:
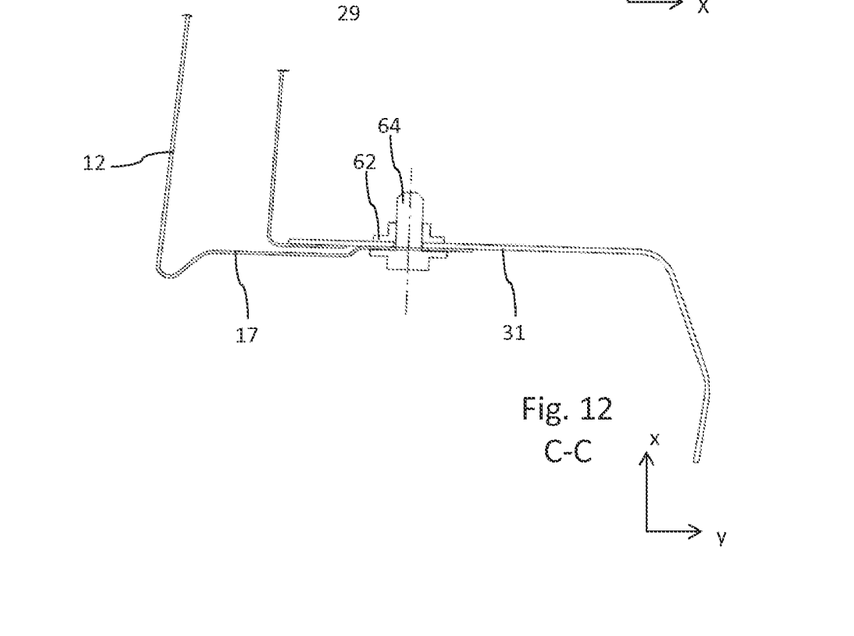
FIG. 12 is a cross-section C-C according to FIG. 9.

The upper outer rear reinforcement profile 31 of the outer side panel element 30 has in addition at least one fastening site 39, illustrated in FIG. 12, for the fender 12. The fender 12 has at its rear end a fastening angle 17 projecting inwardly in the transverse direction (y) of the vehicle, which comes to lie in a covering or overlapping manner against the upper outer rear reinforcement profile 31 aligned parallel hereto. On the inner side, on the upper outer rear reinforcement profile 31 for example a weld nut 62 can be arranged for receiving a threaded fastener 64, so that the threaded fastener 64, penetrating a screw hole provided on the fastening angle 17, is able to be screwed with the threaded fastener nut 62. In this way, the fender 12 can also be fastened at the rear side and detachably on the outer side panel element 30.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A rear side panel assembly of a motor vehicle body comprising:
an inner side panel element having a wheel arch adjoining downwards onto a longitudinal beam and an inner roof frame profile adjoining upwards onto a vehicle roof in relation to a vertical direction of the vehicle; and
an outer side panel element joined to the inner side panel element in a transverse direction of the vehicle, the outer side panel element having on an outer side, facing away from the inner side panel element, a connection region configured for the detachable arrangement of a rear fender.

2. The rear side panel assembly according to claim 1, further comprising a rear fender integrated in a surface-flush manner into an outer contour of the outer side panel element.

3. The rear side panel assembly according to claim 2, wherein the outer side panel element comprises a support for the rear fender above a wheel arch recess which is set back with respect to an outer contour of the side panel element adjoining upwards hereto.

4. The rear side panel assembly according to claim 2, wherein the rear fender fastened to the outer side panel element beneath and adjoining a belt line running substantially in a longitudinal direction of the vehicle.

5. The rear side panel assembly according to claim 4, wherein the outer side panel element, in the region of a belt line, has an outwardly projecting mount configured to couple with an inwardly projecting fastening angle of the fender at a threaded connection.

6. The rear side panel assembly according to claim 1, wherein the inner side panel element comprises an inner rear reinforcement profile extending in the vertical direction of the vehicle.

7. The rear side panel assembly according to claim 6, wherein at least one of the inner rear reinforcement profile and an outer rear reinforcement profile of the inner side panel element comprises at least one through-opening configured to receive a fastening tool.

8. The rear side panel assembly according to claim 1, wherein the inner side panel element comprises a lower outer rear reinforcement profile extending in the vertical direction of the vehicle, which terminates upward in the vertical direction of the vehicle and toward the rear in the longitudinal direction of the vehicle respectively with the wheel arch.

9. The rear side panel assembly according to claim 8, wherein the outer side panel element comprises an upper outer rear reinforcement profile which, with the formation of a reinforcement profile on a rear side is arranged at least partially overlapping with the lower outer rear reinforcement profile.

10. The rear side panel assembly according to claim 9, wherein the upper outer rear reinforcement profile of the outer side panel element comprises at least one fastening site for a rear fastening angle projecting inwards in the transverse direction of the vehicle of the rear fender.

11. The rear side panel assembly according to claim 10 further comprising a fender detachably fastened to the outer side panel element.

12. The rear side panel assembly according to claim 1 further comprising a reinforcement profile, which extends on an outer side of the wheel arch of the inner side panel element with a front profile section from a spring plate connection piece coming to lie at the height of the longitudinal beam to a central profile section arranged at the height of an upper boundary of the wheel arch, on which a shock absorber connection is constructed.

13. The rear side panel assembly according to claim 12, wherein the reinforcement profile, at an end facing away from the spring plate connection piece, has a rear profile section projecting inwards in the transverse direction of the vehicle, wherein the rear profile section is structurally connected with the reinforcement profile.

14. A motor vehicle body comprising a rear side panel assembly according to claim 1.

15. A motor vehicle comprising a vehicle body having a rear side panel assembly according to claim 1.

* * * * *